United States Patent
Horgan et al.

(10) Patent No.: US 11,695,620 B2
(45) Date of Patent: *Jul. 4, 2023

(54) ROOT-CAUSE ANALYSIS OF EVENT OCCURRENCES

(71) Applicant: Extreme Networks, Inc., San Jose, CA (US)

(72) Inventors: Donagh Horgan, Cork (IE); Abdul Razak, Cork (IE); Giacomo Bernardi, Bologna (IT)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,360

(22) Filed: Dec. 21, 2022

(65) Prior Publication Data

US 2023/0124196 A1  Apr. 20, 2023

Related U.S. Application Data

(63) Continuation of application No. 17/209,636, filed on Mar. 23, 2021, now Pat. No. 11,570,039.

(51) Int. Cl.
*H04L 41/0631* (2022.01)
(52) U.S. Cl.
CPC ................. *H04L 41/0645* (2013.01)
(58) Field of Classification Search
None
See application file for complete search history.

(56) References Cited

U.S. PATENT DOCUMENTS

| | | | |
|---|---|---|---|
| 7,027,951 B1 | 4/2006 | MacCormick et al. | |
| 7,889,666 B1 | 2/2011 | Pei et al. | |
| 10,505,825 B1 | 12/2019 | Bettaiah et al. | |
| 10,873,533 B1 | 12/2020 | Ismailsheriff et al. | |
| 2005/0201274 A1* | 9/2005 | Guerin | H04L 45/123 370/390 |
| 2006/0123278 A1 | 6/2006 | Dini et al. | |
| 2015/0254158 A1 | 9/2015 | Puri et al. | |
| 2015/0261195 A1* | 9/2015 | Kami | G06Q 50/10 700/90 |

(Continued)

OTHER PUBLICATIONS

International Search Report and Written Opinion of the International Searching Authority directed to related International Patent Application No. PCT/US2022/019242, dated Jun. 14, 2022; 11 pages.

(Continued)

*Primary Examiner* — Mohamed Ibrahim
(74) *Attorney, Agent, or Firm* — Sterne, Kessler, Goldstein & Fox P.L.L.C.

(57) ABSTRACT

Provided herein are systems and methods for determining relationships between events occurring in networks. Notifications describing events occurring in networks can be received and processed to determine groups of network event types. A root-cause network can be generated based on the events, with the nodes of the root-cause network representing different event types and the edges of the root-cause network indicating directional, causal relationships between the nodes. A received network event can be processed to determine potential causes of the received network event based on the root-cause network and other events received by the network.

20 Claims, 6 Drawing Sheets

(56) References Cited

U.S. PATENT DOCUMENTS

2016/0277268 A1    9/2016  Brown et al.
2019/0173737 A1*   6/2019  Rácz .................... H04W 24/08
2022/0311657 A1    9/2022  Horgan et al.

OTHER PUBLICATIONS

Dynatrace, Automatic Root Cause Analysis—https://www.dynatrace.com/platform/root-cause-analysis/; date assessed Mar. 22, 2021.
Big Panda, 6 Ways to Use IT Event Data to Determine Root Cause Analysis—https://www.bigpanda.io/blog/6-methods-using-event-data-helping-root-cause-analysis/; date assessed Mar. 22, 2021.
Harper, R. and Tee, P., 2019, April. A method for temporal event correlation. In 2019 IFIP/IEEE Symposium on Integrated Network and Service Management (IM) (pp. 13-18). IEEE.
Guyet, T. and Quiniou, R., 2011, June. Extracting temporal patterns from interval-based sequences. In Twenty-Second International Joint Conference on Artificial Intelligence.
Liu, Z., Dev, H., Dontcheva, M. and Hoffman, M., 2016. Mining, pruning and visualizing frequent patterns for temporal event sequence analysis. In Proceedings of the IEEE VIS 2016 Workshop on Temporal & Sequential Event Analysis (pp. 2-4).
Yang, J., McAuley, J., Leskovec, J., LePendu, P. and Shah, N., Apr. 2014. Finding progression stages in time-evolving event sequences. In Proceedings of the 23rd international conference on World wide web (pp. 783-794).

* cited by examiner

ROOT-CAUSE ANALYSIS OF EVENT OCCURRENCES

CROSS-REFERENCE TO RELATED APPLICATIONS

This application is a continuation of U.S. patent application Ser. No. 17/209,636, filed Mar. 23, 2021, which is herein incorporated by reference in its entirety.

BACKGROUND

As industries expand their use of computer networks, network errors and downtime can have an increased negative impact on productivity. Determining the root cause of the errors or downtime can help repair the computer network and avoid future issues. One approach to determine the root cause of the errors is based on experience and knowledge of specific relationships. In other approaches, a correlation is calculated between occurrences of two different network events. The level of correlation can indicate whether one event caused another. However, given the number of possible event types and actual event occurrences, the correlation calculations can be computationally expensive. Because each event type can potentially be caused by any event type, as the number of event types increases, complexity rises accordingly.

SUMMARY

Provided herein are system, method, and computer program product aspects and/or combinations and sub-combinations thereof, which provide root-cause analysis of event occurrences (e.g., arbitrary event occurrences).

Systems and methods for providing root-cause analysis of event occurrences can include generating or updating a root-cause network by comparing an arrival time distribution to a reference distribution to determine a relationship between a first network event type and a second network event type. The arrival time distribution can be based on a time difference between an occurrence of the first network event type and an occurrence of the second network event type. The occurrence of the second network event type can happen after the occurrence of the first network even type. A relationship probability for an edge in a root-cause network can be updated based on the determined relationship. The edge can connect a first node in the root-cause network representing the first network event type to a second node in the root-cause network representing the second network event type.

Systems and methods for providing root-cause analysis of event occurrences can include receiving a first event notification associated with a first network event and receiving a second event notification associated with a second network event, both network events occurring in a network. The first network event can be the first network event type and the second network event can be the second network event type. The second network event can occur after the first network event. In response to receiving the first network event notification and the second event notification, the systems or methods can include searching for an edge in the root-cause network. In response to finding the edge, a notification about the second network event can be generated. The notification can include a remedial response based on a relationship probability of the edge.

Further aspects, features, and advantages of the present disclosure, as well as the structure and operation of the various aspects of the present disclosure, are described in detail below with reference to the accompanying drawings.

BRIEF DESCRIPTION OF THE DRAWINGS/FIGURES

The accompanying drawings, which are incorporated herein and form a part of the specification, illustrate aspects of the present disclosure and, together with the description, further serve to explain the principles of the disclosure and to enable a person skilled in the art(s) to make and use the aspects.

In the drawings, like reference numbers generally indicate identical or similar elements. Additionally, generally, the left-most digit(s) of a reference number identifies the drawing in which the reference number first appears.

DETAILED DESCRIPTION

Figure 1:
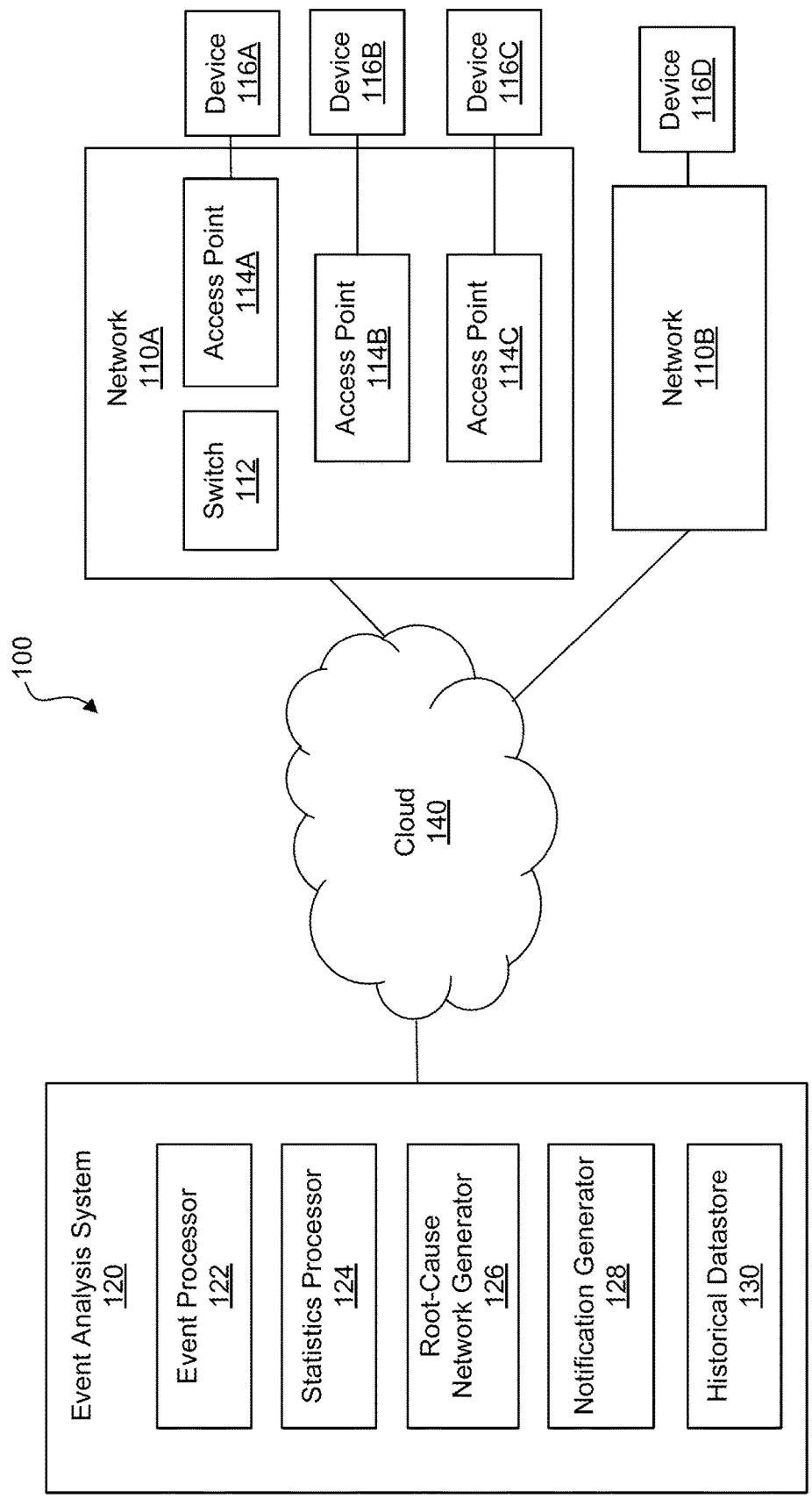
FIG. 1 illustrates a block diagram of a root-cause analysis system, according to some aspects.

Provided herein are system, method, and computer program product aspects and/or combinations and sub-combinations thereof, which provide root-cause analysis of event occurrences (e.g., arbitrary event occurrences).

Root-cause analysis can be used to evaluate events occurring in a network and determine or estimate a cause for the events. These events can be, for example, network events. In some systems, the cause for an event can be determined based on empirical knowledge of a network user or correlation based on historical data.

As an example of empirical knowledge, a network user may have learned that an event of a certain type in a network is caused by a different event in the network. A rule can be programmed into a root-cause analysis system that, when an event of the certain type occurs and if the different event occurred first, the different event can be identified as the cause of the event in that network.

As an example of correlation, historical data can be monitored and processed to determine if a first event occurring in a network after a second event occurring in the network are correlated. If a correlation is found, the second event can be identified as causing the first event.

Root-cause analysis can be complex, given the large number of events that can be tracked and monitored. As non-limiting examples, events can include alerts for latency delays, network performance issues, loss of connection, alerts for loss of connection quality, and network software, firmware, or hardware updates.

As the number of tracked events grows, empirical knowledge can fail to identify the rules and calculating correlations can grow computationally expensive. For example, in some systems, computational complexity can increase as the square of the number of event types considered.

Further, interactions that are more complex can occur. For example, an event can cause more than one event. As another example, an event can be caused by another event when they occur close together in time, but is not caused by the other event when they occur further apart in time. As still another example, an event can be caused by another event, but only when they occur within the same part of a network topology or policy. The complexity of the causal relationships between events can reduce the accuracy of root-cause analysis.

Further, some events occur less often than others. Accurate analysis of correlation becomes more difficult to detect with fewer samples. Correlations determined from a small sample size can be statistically insignificant, resulting in a false detection of relationships or a failure to detect an existing relationship.

Additionally, root-cause analysis must be handled across all of the devices in the network. For example, if an access point in a network runs out of memory, the access point can disconnect devices connected to it. Each disconnected device can experience an event, in which an event of a disconnected device can be different from that of another disconnected device. With the large number of networked devices currently in use, there can be a large volume of events to process.

As a result, root-cause analysis systems can be configured to provide limited identification of event causes. For example, rules can only include well-known event relationships. As another example, correlation calculations can limit the amount of factors considered, such as by only looking at events that occur within a certain time of each other.

In some aspects of the systems and methods described herein, root-cause analysis can be performed for an arbitrary number of event types while increasing complexity at a rate less than the square of the number of event types considered. In some aspects, event relationships can be identified that are statistically significant and indicate a relationship measure that is stronger than correlation. In some aspects, root-cause analysis can include additional factors, such as time difference, network topology, and policy factors. In some aspects, root-cause analysis can include determining relationships for time differences between event occurrences without using a limited time difference between events.

FIG. 1 illustrates a block diagram of a root-cause analysis system 100, according to some aspects. Root-cause analysis system 100 can connect networks, such as networks 110A and 110B, to an event analysis system 120 through a cloud 140.

Network 110A includes a switch 112 connected to access points 114A-C. Access points 114A-C can provide network services for users, such as devices 116A-C, which are each connected to one of respective access points 114A-C. Switch 112 allows network 110A to connect access points 114A-C to cloud 140.

In some aspects, access points 114A-C can be different access points for network 110A with switch 112 controlling access to cloud 140. In other aspects, each of access points 114A-C can provide a network and switch 112 incorporates them into another network (e.g., network 110A). For example, network 110A can be for a building and each of access points 114A-C can be for a different floor of the building.

Network 110B is connected a device 116D. Network 110B can provide network services to device 116D.

In some aspects, networks 110A and 110B can be part of a larger network. For example, a single entity (e.g., a business) can use networks 110A and 110B, with each network being operated in a different building or space used by the entity.

Networks 110A and 110B are exemplary, but should not be seen as limiting the number of networks in root-cause analysis system 100 or the configuration of those networks. A variety of network combinations are possible, with more networks than networks 110A and 110B, as well as different combinations of switches 112 and access points 114A-C, and different connections to devices 116A-D. Other network devices (not shown) can also be included in the networks.

Networks 110A and 110B, switch 112, access points 114A-C, and devices 116A-D can generate network event notifications. Network event notifications can include one or more of a description of an event that has occurred, topology information on where the event occurred, and a timestamp indicating a time when the event occurred. The description can be human-readable words or sentences describing the event or can be a code or symbolic designation for the event. The description can be software generated.

As a non-limiting examples, events that can trigger network event notifications can include events such as parameter changes, radio power changes, airtime consumption alarms, transmitter retry alarms, station deauthentication, station authentication, station internet protocol (IP) address changes, dynamic host configuration (DHCP) server becoming unavailable, or other events occurring in networks 110.

The topology information can be information indicating where in network 110A or 110B an event occurred. Topology information can include logical partitions of one or more networks, such as different floors, different subnets, different buildings, or other partitions. For example, if an event occurs in device 116B, the topology information can indicate where the event occurred, that device 116B is connected to access point 114B, that access point 114B connects to switch 112, and that the event occurred in network 110A connected to cloud 140.

In some aspects, network topology information can include policy information on how a network is structured. For example, if access points 114B and 114C are part of a subnetwork of network 110A that is separate from access point 114A, a network event generated in access point 114B can indicate that access point 114B is part of that subnetwork.

Event analysis system 120 can monitor and perform root-cause analysis for networks 110A and 110B through cloud 140. Event analysis system 120 can have an event processor 122, a statistics processor 124, a root-cause network generator 126, a notification generator 128, and a historical datastore 130. Event analysis system 120, event processor 122, statistics processor 124, root-cause network generator 126, notification generator 128, and historical datastore 130 can be implemented as part of or by a computer system 600, as described in FIG. 6.

Event processor 122 can receive network event notifications from networks 110A and 110B, including from devices and systems that are part of or connected to those networks. Event processor 122 can process the network event notifications, send them to historical datastore 130 for storage, and control analysis of a network event for which network event notifications are received.

In some aspects, processing the network event notifications can include normalizing the event description. For example, event processor 122 can use natural language processing or regular expressions to remove information in the network event notification that is not relevant to identifying the event type. The irrelevant information can include "stop words," such as "a" or "the," as well as information such as an IP address and a media access control (MAC) address.

Normalizing the event description can transform the event description into a generic description of the event. In some aspects, the root-cause analysis described herein is agnostic to a human-understandable name or type of an event. For example, the root-cause analysis does not need to know if an event is a disconnect event. Instead, the root-cause analysis only needs to differentiate the event from other events. Thus, the systems and methods described herein can process events that are unknown beforehand (e.g., arbitrary events).

In some aspects, normalizing the event description can result in a generic label or number that differentiates one event type from another. In some aspects, the event description can include such a generic label or number prior to being normalized.

In some aspects, processing the network event notifications can include sorting or categorizing the network event notifications based on the topology information. For example, an event can be categorized based on where in a network the event occurred. In some aspects, event processor 122 can separate events based on different topology and policy information in the network event notification. In some aspects, event processor 122 can access the network policy and apply the network policy to separate network event notifications based on the partitions in the network policy and the topology information in the network event notifications.

In some aspects, separating or categorizing the network event notifications based on topology information can improve computational efficiency in event processor 122 or event analysis system 120. For example, by separating events based on a topology factor (e.g., network event notifications received from devices in different buildings), events occurring in a first building are separately categorized from events occurring in a second building. Events in different topological partitions can be processed separately. Since the separated groups of events are smaller than the total number of events, processing the groups separately reduces the number of comparisons between events that must be made overall. In some aspects, different root-cause networks can be generated for different portions of the network topology.

In some aspects, event processor 122 can control analysis of events for received network event notifications. Controlling analysis can include accessing statistics processor 124, root-cause network generator 126, notification generator 128, and historical datastore 130. Event processor 122 can analyze a network event notification to determine one or more potential causes for the event that resulted in the generation of the network event notification. In some aspects, a root-cause network or graph generated by root-cause network generator 126 can be used to identify the potential causes for the event.

Statistics processor 124 can perform statistical analysis, including determining if data for a pair of network events is statistically significant, determining an arrival time distribution, and comparing the arrival time distribution to a reference distribution. In some aspects, if the data is not statistically significant, the data is not further processed until enough additional occurrences of the pair of network events occurs to cause the data to be statistically significant.

In some aspects, statistics processor 124 can retrieve data for events from historical datastore 130. Statistics processor 124 can process data for some or all of the event types stored in historical datastore 130. In some aspects, statistics processor 124 can access and process data for a pair of events. The pair of events can be two network events that have occurred in a network, such as networks 110A and 110B. The data for the pair of events can include each occurrence of the two events. In some aspects, only occurrences that have timestamps since the last time statistics processor 124 processed the two events are processed.

Statistics processor 124 can process the two events as a pair of events. One event is hypothesized to have caused the other event. Pairs of consecutive occurrences of the two events can be identified. In some aspects, statistics processor 124 can determine if the number of pairs is statistically significant. The determination can be based on sampling and estimation theory.

Statistics processor 124 can determine the arrival time distribution for the pairs of consecutive occurrences. The timestamps for each occurrence can be compared to determine an arrival time difference between the two occurrences. The arrival time distribution is the distribution of the arrival time differences for the pairs in the data for the pair of events. In some aspects, the arrival time distribution can be stored in historical datastore 130 or sent to root-cause network generator 126.

In some aspects, statistics processor 124 can compare the arrival time distribution to a reference distribution. In some aspects, the reference distribution is a uniform distribution representing a random distribution of arrival times for a pair of consecutive event occurrences. In some aspects, statistics processor 124 can generate random event arrival times to approximate a random distribution for use as a reference distribution.

In some aspects, the reference distribution can be an expected distribution. For example, a first event can be known to cause a second event within a certain time period. The reference distribution can be a known or estimated distribution reflecting a relationship between the first and second events.

In some aspects, the reference distribution can be a historical distribution. For example, statistics processor 124 can process data for a pair of events and determine a first arrival time distribution. After some time, additional data on the pair of events can be received by event processor 122 and stored in historical datastore 130. The additional data for the pair of events can be processed by statistics processor 124 and a second arrival time distribution can be determined. The first arrival time distribution can be the historical distribution and be used as the reference distribution for comparison to the second arrival time distribution.

In some aspects, statistics processor 124 can compare the arrival time distribution to the reference distribution to generate a metric or measure that indicates whether or not the arrival time distribution is the same or different from the reference distribution. The metric or measure can be a probability or probabilistic measure that indicates a likelihood that the arrival time distribution and reference distribution are the same. In some aspects, if the measure is greater than a threshold, the measure can indicate that the arrival time distribution is different from the reference distribution. In some aspects, a reference distribution that is a uniform distribution indicates a relationship between the pair of events and that one event caused the other event with some probability.

In some aspects, if the measure is greater than the threshold, a reference distribution that is an expected or historical distribution indicates that the relationship between the pair of events has changed from what was expected or historically observed by event analysis system 120.

In some aspects, distribution comparison can provide a stronger indication than calculating a correlation that there is a causal relationship between two events.

In some aspects, statistics processor 124 can compare the arrival time distribution to the reference distribution using relative entropy. Relative entropy can be calculated as a Kullback-Leibler (KL) divergence, which can be used as the measure. In some aspects, calculating the KL divergence can be more computationally efficient than other comparisons. Other means of comparing the distributions can be used.

In some aspects, because the distributions naturally include each observed time difference, the computational cost of comparison is not increased by including larger time differences. Thus, some aspects of the systems and methods disclosed herein can provide accurate root-cause analysis for events that are not time-windowed without increasing the computational complexity. The lack of time-windowing can improve root-cause analysis performance over systems that limit time differences between events using a time window, as causal relationships that occur with time differences larger than the time window can be detected.

In some aspects, root-cause network generator 126 can generate a root-cause network or graph. Root-cause network generator 126 can store the root-cause network in root-cause network generator 126 or in historical datastore 130. The root-cause network or graph can include a set of nodes and a set of edges. Each node can represent a type of event. Each edge can directionally connect two nodes to indicate a causal relationship between the two types of events corresponding to the two nodes. The root-cause network is more fully described below in FIG. 3.

Root-cause network generator 126 can generate or update a root-cause network based on the measure determined by statistics processor 124. In some aspects, root-cause network generator 126 can assign the relationship probability based on the arrival time distribution and the measure determined from the comparison between the arrival time and reference distributions. In some aspects, if the comparison between the arrival time distribution and the reference distribution indicates that the arrival time distribution is not statistically different from a uniform distribution, root-cause network generator 126 can remove or not add the directional edge for the given pair of event types for the direction in the comparison.

In some aspects, root-cause network generator 126 can assign a relational time difference to an edge indicating a time difference over which the two nodes are causally linked. In some aspects, the relational time difference can be a time range or a distribution, such as the arrival time distribution.

In some aspects, the relationship probability can vary based on a given arrival time and the corresponding probability for that arrival time in the arrival time distribution. In such aspects, two nodes can be connected by an edge and have a causal relationship that varies based on a given arrival time. For example, for arrival times with a probability in the distribution greater than a threshold, the event types are considered causally related, while for arrival times with a probability in the distribution less than the threshold, the event types are considered causally unrelated.

In some aspects, root-cause network generator 126 can generate the root-cause network by adding nodes for each network event type and edges between causally related network event types based on the data processed by statistics processor 124. In some aspects, root-cause network generator 126 can update the root-cause network by updating edges based on the data processed by the statistics processor 124.

In some aspects, when updating the root-cause network, root-cause network generator 126 can add nodes for network event types that were not previously observed. In some aspects, root-cause network generator 126 can break edges where statistics processor 124 has determined that two connected nodes are no longer causally related.

In some aspects, notification generator 128 can generate notifications on relationships between events. A notification can be generated in response to event processor 122 identifying a relationship between two events. The notification can include that a first event causes a second event, a likelihood that the first event causes the second event, a time difference between the occurrence of the two events, and a recommended course of action for repairing or resolving the second event. Notification generator 128 can send the notifications to users or networks, such as networks 110A and 110B, or can store the notifications in historical datastore 130.

In some aspects, the recommended course of action can be based on historical data or knowledge. For example, a first event can be an update to a network configuration and a second event can be a user's terminal losing network connectivity. Event processor 122 can determine that the change to the network configuration caused the user's terminal to lose connectivity based on a root-cause network stored in the historical datastore 130. A remedial action to an issue with the update to the network configuration can be a roll back of the network configuration to its previous state. The remedial action can be based on empirical knowledge of such events. In response to event processor 122 identifying the relationship, notification generator 128 can generate a notification with the relationship and include the remedial action as a recommendation.

In some aspects, the notification can be configured to cause a network to take the suggested remedial action. For example, the notification can be sent to the network, such as networks 110A and 110B, where the event occurred and include instructions or code that cause the network to take the remedial action. The notification can allow the event analysis system 120 to automatically resolve network events occurring in networks 110A and 110B without user involvement.

In some aspects, event processor 122 can analyze events in response to a user query regarding an event. Notification generator 128 can generate notification(s) for the identified relationships between the event and other events. In some aspects, where event processor 122 identifies no relationships between the event and other events, notification generator 128 can generate a notification to the user that the event does not have a causal relationship with the logged events.

In some aspects, historical datastore 130 can receive data, store data, and provide data to event processor 122, statistics processor 124, root-cause network generator 126, and notification generator 128. The data can include network event notifications received or processed by event processor 122, distributions calculated or compared by statistics processor 124, root-cause networks generated or updated by root-cause network generator 126, and notifications generated by notification generator 128.

In some aspects, historical datastore 130 can be memory in one or more computer systems 600 for event analysis system 120. The memory can be distributed amongst event processor 122, statistics processor 124, root-cause network generator 128, and notification generator 128 or can be a single memory or storage device.

Figure 2:
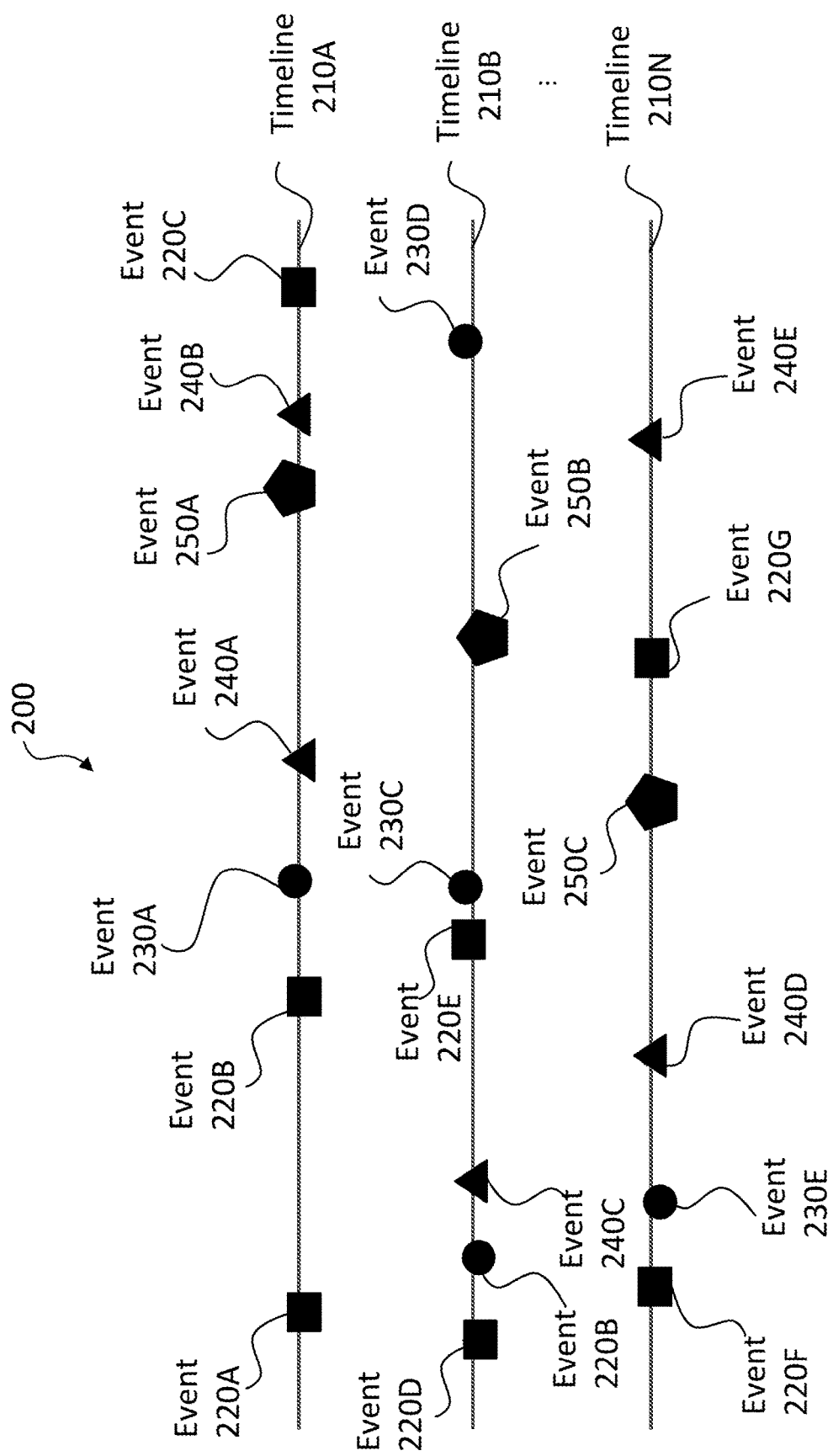
FIG. 2 illustrates a block diagram of an event timeline for events occurring in networks, according to some aspects.

FIG. 2 illustrates a block diagram of an event timeline 200 for events occurring in networks, according to some aspects. Event timeline 200 is an example timeline of network events occurring in different parts of a network, such as networks 110A and 110B.

In some aspects, event timeline 200 can be broken up into different portions based on a network policy and topology. Time can be seen along these timelines as proceeding from left to right across the page (meaning in the direction of, for example event 220A towards event 220C, so event 220A temporally occurs before event 220C). These portions can be timelines 210A, 210B, and so on to 210N (collectively, "timelines 210"). Any number of timelines 210 can be present. For example, network 110A in FIG. 1 has three access points. Each access point can be assigned its own timeline, such as timeline 210A corresponding to access point 114A, timeline 210B corresponding to access point 114B, and timeline 210N corresponding to access point 114C.

In some aspects, network events can be separated by where, hierarchically, in a topology they occur. For example, events experienced by switch 112 can be separated from events occurring in access points 114A-C. A separate timeline (not shown) can be used for each partition of a network.

Events on each timeline are represented by shapes, with each shape corresponding to an event type. Events 220A-G are represented by a square and are a first event type. Events 230A-E are represented by a circle and are a second event type. Events 240A-E are represented by a triangle and are a third event type. Events 250A-C are represented by a pentagon and are a fourth event type. The numbers and types of these events are exemplary and should not be seen as limiting.

The arrival time distributions generated by statistics processor 124 can be based on the information that is represented in timelines 210. For example, a first pair of events can be event 220B occurring before event 230A. This first pair provides a data point for a first arrival time distribution for events 230 being caused by events 220. The data point can be the time difference between the occurrences of these two events. A second pair of events can be event 220C occurring after event 230A. This second pair provides a data point for a second arrival time distribution. The second arrival time distribution can be for events 220 being cause by events 230. Again, the data point can be the time difference between the occurrences of the two events.

In some aspects, events occurring in different areas of the network, as defined by topology or policy for the network, can be divided into different groups even if they are otherwise of the same event type. For example, events 250A-C are of the same event type. However, they can be divided into different timelines 210 based on, for example, the fact that each occurs in a different access point 114 in network 110A.

Event processor 122 can process an event, as described in this application, to determine possible causes among other events. In terms of timeline 210A, event processor 122 can, for example, process event 240B to determine if event 240B was caused by event 250A, event 240A, event 230A, event 220B, or event 220A.

In some aspects, processing of events by event processor 122 or statistics processor 124 is performed based on a nearest neighbor approach. That is, each event is temporally compared to its nearest neighbors. For example, event 220B can be processed as a possible cause of event 230A, but not event 220A, as event 220B is closer on timeline 210A.

In some aspects, the nearest neighbor approach is applied on an event-type basis. For example, events 230A and 220B can both be possible causes of event 240A, as they are the closest temporal events and are different event types. Event 220A is not a possible cause because another event of the same event type, event 220B, is temporally closer to event 240A.

In some aspects, event timeline 200 is exemplary of visual presentation of network events for evaluation by a user as part of event processor 122. For example, a user can be presented with a list or graphic displaying occurrences of events. Event timeline 200 can be the visual interface, with each event type being differentiated by a symbol or color (not shown) from other event types. The user can select an event from the list or graphic, such as by clicking the event using a mouse pointer. Event processor 122 can, in response to the selection, process the selected event to determine possible causes for the event.

Figure 3:
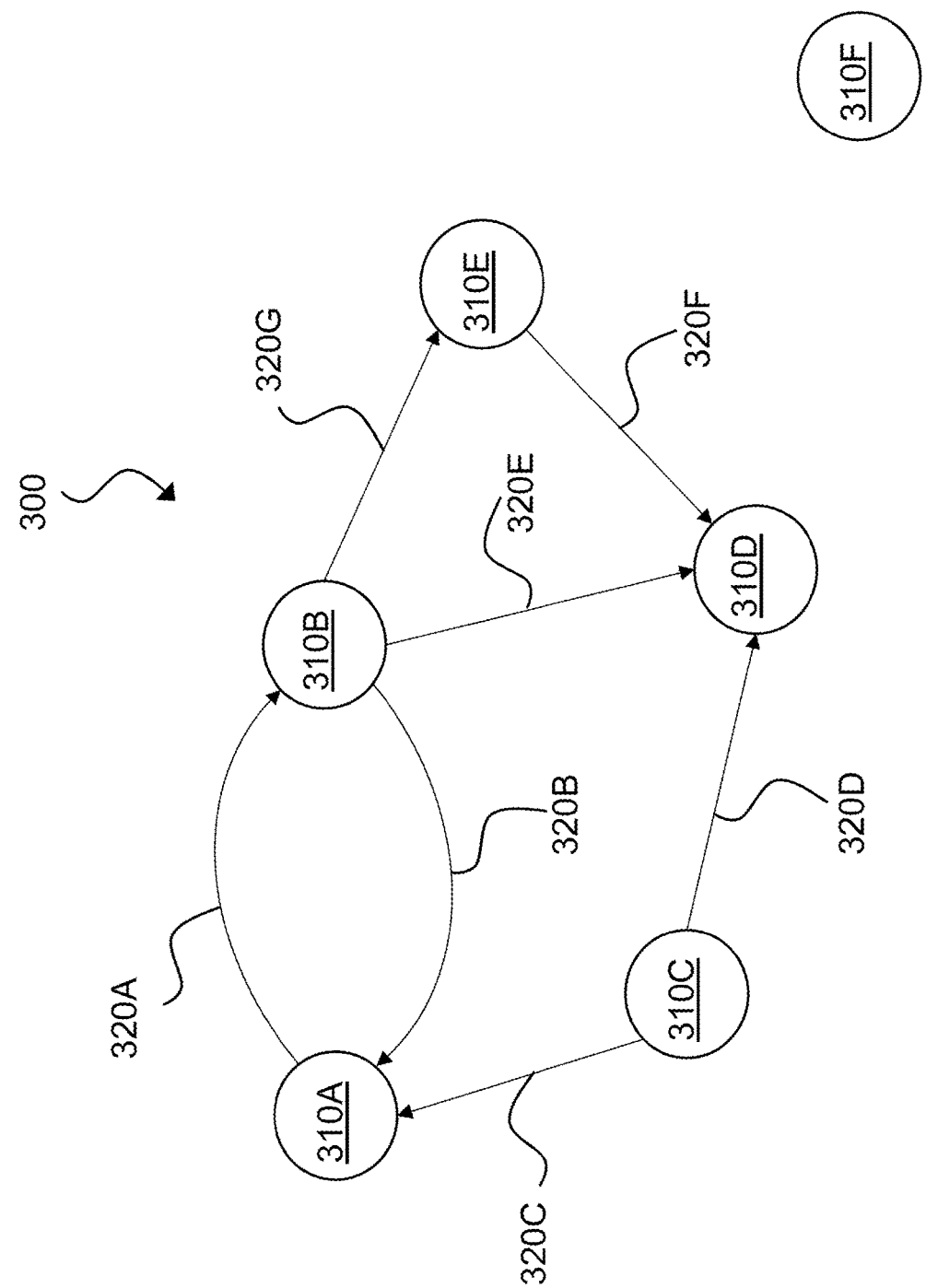
FIG. 3 illustrates a block diagram of a root-cause network, according to some aspects.

FIG. 3 illustrates a block diagram of a root-cause network 300, according to some aspects. Root-cause network 300 can have nodes 310A-F connected by edges 320A-G. Each node 310A-F can represent an event type. Each edge 320A-G can indicate a causal connection. Each edge 320A-G is directional, as indicated by the arrows, with the arrow indicating the direction of the causality For example, node 310A is connected to node 310B by edges 320A and 320B. The arrow for edge 320A indicates that edge 320A is a connection where the event type corresponding to node 310A can cause the event type corresponding to node 310B. Edge 320B indicates the opposite; that is, that the event type of node 310B can cause the event type of node 310A.

In some aspects, a pair of events can be defined based on two nodes 310 in root-cause network 300. For example, node 310A and node 310F can form a pair of events for two events of the event types corresponding to nodes 310A and 310F. However, since there is no edge connecting nodes 310A and 310F, this pair of events is not causally related.

For pairs of events corresponding to nodes 310 that are connected by edges 320, the directional connection of edge 320 is considered to pass from the first event type to the second event type. The first event is considered to have occurred before the second event. For example, the first event in the pair has an event type that corresponds to a first node, such as node 310B. The second event in the pair has an event type corresponding to the second node, such as node 310A. The edge connecting the two (in this case, edge 320B) indicates the direction of the pair—from the first event to the second event. Note that in this example, edge 320A is in the opposite direction and is not the edge for this pair. Instead, edge 320A connects in the opposite direction and would be for a first event of the event type corresponding to node 310A occurring before a second event of the event type corresponding to node 310B.

Different event types can have different relationships. The relationships indicated by edges 320A-G in FIG. 3 are exemplary, and other configurations for root-cause networks are possible.

Root-cause network 300 illustrates several non-limiting examples of event type relationships. For example, in some aspects, a pair of nodes 310, such as nodes 310A and 310B, can both potentially cause each other, as indicated by edges 320A and 320B connecting in both directions. In some aspects, a pair of nodes 310 can be causal in a single direction, such as edge 320C connecting nodes 310C and 310A, but no corresponding edge connecting in the opposite direction. In some aspects, nodes 310 can correspond to event types that only cause other events, such as node 310C, with edges 320C and 320D only connecting directionally away from node 310C. In some aspects, nodes 310 can correspond to event types that are only caused by other events, such as node 310D, with edges 320D, 320E, and 320F only connecting directionally towards node 310D. In some aspects, nodes 310 can correspond to event types that both cause and are caused by other events, such as node 310E, with edge 320G connecting directionally towards node 310E and edge 320F connecting directionally away node 310E. In some aspects, nodes can represent event types that are not causally related to other events, such as node 310F, which is not connected by edges 320 to any other nodes 310.

As a non-limiting example, in root-cause network 300, airtime consumption alarms can be an event assigned to node 310C, transmitter retry alarms can be an event assigned to node 310E, and station deauthentication can be an event assigned to node 310D. Edge 320D indicates that airtime consumption alarms can potentially cause station deauthentication. Edge 320F indicates that transmitter retry alarms can also potentially cause station deauthentication.

In some embodiments, root-cause network 300 can include relationships where multiple events, in combination, are a potential cause for another event. In such embodiments, root-cause network 300 can include edge 320 that is a connection from the multiple events to the other event. In some embodiments, a single event can cause multiple events and root-cause network 300 can include edge 320 that is a connection from the single event to each of the multiple events. The relationship probability for edge 320 can be a conditional probability.

Where two or more events cause another event, root-cause network 300 can identify single event relationships. However, such relationships may not fully capture the causal relationship between the two or more events and the other event. However, the conditional edge (e.g., an edge 320 from two or more events to a single event) can more fully capture the relationship. In some embodiments, the use of conditional probabilities as relationship probabilities on edges 320 improves identification of potential causes of events.

As a non-limiting example, airtime consumption alarms can be an event assigned to node 310C, transmitter retry alarms can be an event assigned to node 310E, and station deauthentication can be an event assigned to node 310D. Edge 320D indicates that airtime consumption alarms can potentially cause station deauthentication. Edge 320F indicates that transmitter retry alarms can also potentially cause station deauthentication.

The relationship in this example is that the combination of the airtime consumption alarm and the transmitter retry alarm cause the station deauthentication. However, the relationship probabilities on edges 320D and 320F will also include cases where airtime consumption alarms and transmitter retry alarms occur separately. These additional cases can alter the relationship probability, as the lack of the second event occurrence means that a station deauthentication is unlikely to occur (at least as a result of the individual alarm events). Thus, root-cause network 300 reflects a weaker relationship. The relationship probabilities can be, for example, 50% on edge 320D and 45% on edge 320F. The relationship reflected by these relationship probabilities may not indicate a strong connection among the events. In contrast, the conditional probability of station deauthentication—given that both an airtime consumption alarm and a transmitter retry alarm have occurred—can be, for example, 98%. The conditional probability indicates that a station deauthentication likely occurs when both alarm events occur.

In some aspects, root-cause network generator 126 can use root-cause network 300 to predict future events. For example, a first event can occur that has node 310 with its event type present in root-cause network 300. Root-cause network 300 can suggest possible event types that could be caused by the first event based on the connections in root-cause network 300.

For example, an event with an event type corresponding to node 310D can occur in the network. Possible causes for this event can be events with types corresponding to nodes 310B, 310D, and 310E, as indicated by edges 320D, 320E, and 320F, respectively.

These possible event types can occur with a likelihood based on the respective relationship probabilities connecting from the first event type to the other event types. In some aspects, the arrival time distribution for these relationship probabilities can be used to estimate the most likely time when such other events occur, such as the arrival time difference that has the highest probability.

In some aspects, notification generator 128 can generate a notification that includes a set of possible events with the highest likelihood of being the cause of the first event. Referring to the example above for node 310D, three event types are connected as possible root causes of the event type corresponding to node 310D. If events with those three event types occurred before an event of the event type for node 310D occurred, those three event types can be included in the notification as possible causes. In some aspects, the relationship probability for those three instances can be evaluated at the arrival time difference to the event type that is actually observed for the event occurrences. Each relationship probability that is over a threshold can be included in the notification as a possible cause of the event.

In some aspects, event processor 122 can use root-cause network 300 to process a sequence with more than two events. As a non-limiting example, a first event with an event type corresponding to node 310A can cause a second event with an event type corresponding to node 310B, as indicated by edge 320A. The second event can then cause a third event with event type corresponding to node 310E, as indicated by edge 320G. Root-cause network 300 can be used by event processor 122 to identify that the third event was caused by the second event and then further process the second event to identify that the second event was caused by the first event.

Figure 4:
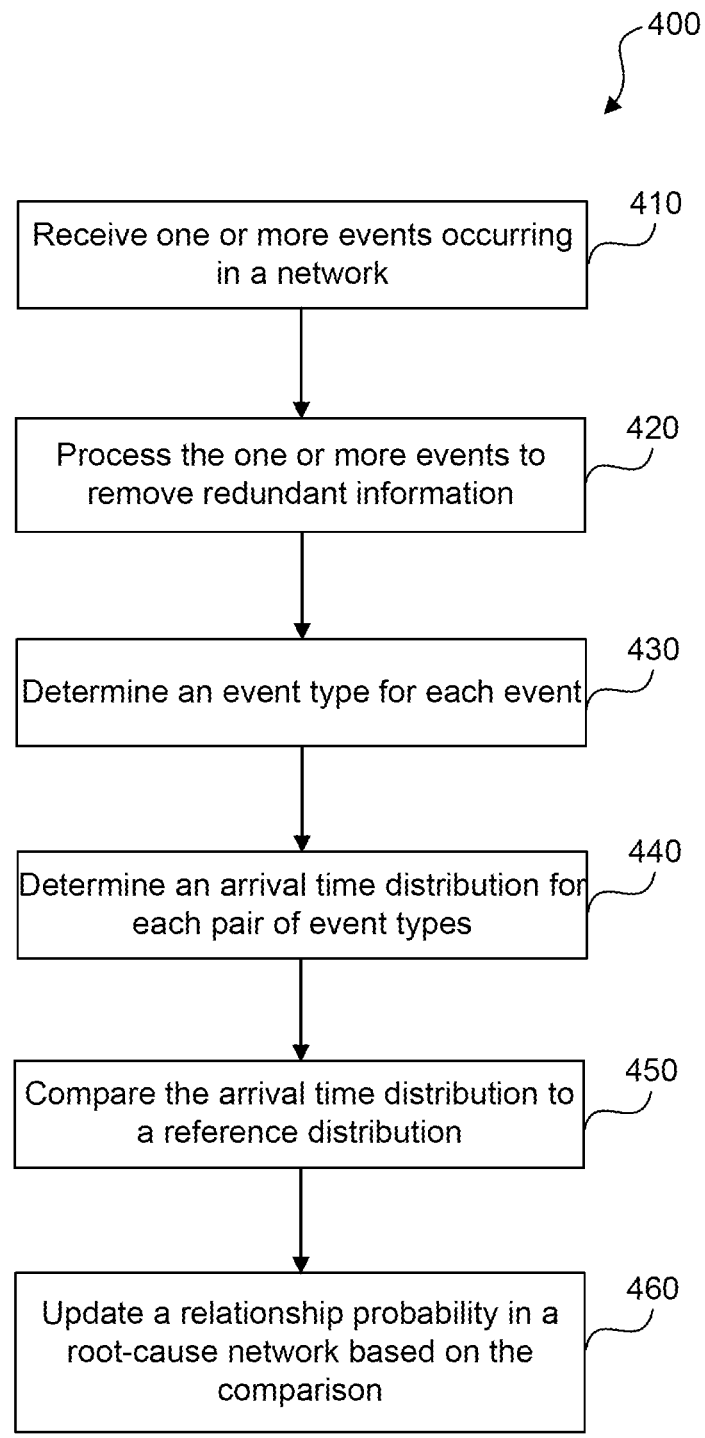
FIG. 4 is a flow chart illustrating a method for generating or updating a root-cause network, according to some aspects.

FIG. 4 is a flow chart illustrating a method 400 for generating or updating a root-cause network, according to some aspects. Event analysis system 120 of FIG. 1 can perform method 400. Method 400 can be performed on a set of events or network event notifications, such as those that can be stored in historical datastore 130 of FIG. 1.

In some aspects, method 400 can be performed a single time on each event or network event notification or on each set of events or network event notifications. For example, method 400 can be performed on a first set of events or network event notifications and a root-cause network can be generated or updated. Later, a second set of events or network event notifications, separate from the first set, can be gathered. Method 400 can then be performed on the second set of events or network event notifications and the root-cause network can be updated accordingly.

In some aspects, method 400 can be performed periodically. For example, method 400 can be performed when a certain number of events have been gathered, or can be performed after a certain amount of time has passed, such as once a day. In such aspects, root-cause network 300 can be continually updated to reflect changes in relationships between events as the network(s) in which the events occur changes.

In 410, method 400 includes receiving one or more events occurring in a network. The events can be received by event processor 122. An event can be received as a network event notification or another type of notification indicating that the event occurred. In some aspects, the network event notification can include a timestamp for when the event occurred, a description of the event, and topology information on where in a network the event occurred. Network event notifications can be received in response to an event occurring in the network.

In 420, method 400 includes processing the one or more events to remove redundant information. Operation 420 can be performed by event processor 122.

In some aspects, removing the redundant information can include processing the description of the event to reduce the description to the minimal amount of information necessary. For example, regular expressions or natural language processing can be applied to remove excess words, such as stop words. Other information, such as an IP address or a MAC address, can also be removed. The description can be reduced to the key factors or words that identify the event.

In some aspects, operation 420 is optional. For example, received events can be formatted such that no redundant information is present and operation 420 is unnecessary. Alternatively, processing of events can be performed on the full network event notification without the additional processing of operation 420.

In 430, method 400 includes determining an event type for each event. Operation 430 can be performed by event processor 122. The event type can be determined based on the description of the event. In some aspects, the network topology can also be used to determine the event type.

In some aspects, the event type is a label for the event type, such as a name, symbol, and string of letters and/or numbers. The event type can be generic and does not need to describe the event. For example, one or more network event notifications can describe loss of service for a user terminal. These network event notifications can be sorted into an event type with a label that does not describe the event, but instead provides a category for putting events with similar event descriptions into a single group that contains that event type.

In some aspects, operation 430 includes adding each event with a matching event type to a group. A group or set can be formed for each type of event identified in operation 430.

In some aspects, event types can also be determined based on topology information. Topology information can define that an event occurs in a certain device or subnet or occurred in a different physical building or on a different floor of a building. In some aspects, the topology information can be divided into groups or portions based on a network policy. Event types can be identified by both actual event type and topology information to separate events occurring in different portions of the network topology.

In 440, method 400 includes determining an arrival time distribution for each pair of event types. A pair of event types can be events of a first and second event type, where the first event occurs before the second event. The arrival time distribution can be determined for each pair of events of the first and second event types where a first event of the first network event type occurs before a second event of the second event type. In some aspects, the occurrence of the first event type is also a closest event type that has the shortest difference in arrival time or occurrence before the occurrence of the second event type.

For example, referring to FIG. 2, event 220B and event 240A can be a pair of events. Similar pairs occur between event 240C and event 220D, event 240D and event 220F, and event 240E and event 220G. These different pairs can be used together for generating a single arrival time distribution that includes timelines 210A-N or can be used separately to generate respective arrival time distributions for each timeline 210A-N. Operation 440 can be performed by statistics processor 124.

For each pair of events, the timestamps for each event can be compared to determine an arrival time difference between the two events in the pair. The arrival time distribution can be formed as a distribution of the arrival time differences for each pair of events.

In 450, method 400 includes comparing the arrival time distribution for each pair of event types. The arrival time distribution can be compared to a reference distribution. The reference distribution can be a uniform distribution, a historical distribution, or an expected distribution. Operation 450 can be performed by statistics processor 124.

In some aspects, comparing the arrival time distribution to a reference distribution can determine whether the arrival time distribution differs from the reference distribution. For example, a uniform reference distribution can indicate that the pair of event types occur randomly because the time difference between them can take any length. The randomness of the time difference can suggest that the event types are unrelated.

If the arrival time distribution is compared to a uniform distribution and does not differ significantly, as measured by a metric of the comparison, then the pair of event types are not considered to be related and the first event type can be considered to have not caused the second event type. However, if the metric indicates that the arrival time distribution differs from the reference distribution, then the first event type can be considered to have caused the second event type. In some aspects, the metric of comparison is a KL divergence. The arrival time distribution can be considered to differ significantly from the reference distribution when the KL divergence is greater than the threshold. Otherwise, the arrival time distribution is considered not to differ significantly from the reference distribution.

In some aspects, the arrival time distribution can be evaluated at a given arrival time difference between a first event and a second event occurring after the first event. The value of the arrival time distribution can be a likelihood that the first event is the cause of the second event.

In some aspects, the arrival time distribution can be used to identify a relational time difference for a pair of event types. The relational time difference can be a time difference or range of time differences for which the first event type in the pair of event types is considered to cause the second event type in the pair of event types. In some aspects, the time difference can be the time difference with the highest likelihood in the arrival time distribution. In some aspects, the range of time differences can be time differences for which the arrival time distribution has a likelihood value greater than a threshold. In some aspects, the arrival time distribution can be used as the relational time difference.

As an example, if the threshold is set at a normalized likelihood of 0.4, and the arrival time distribution is above 0.4 between one second and three seconds, the range of time differences is from one to three seconds.

A variety of methods exist for comparing two distributions. Any of these methods can be used in operation 450. In some aspects, the comparison involves determining the KL divergence between the arrival time distribution and the reference distribution. The KL divergence can be used as a metric or measurement of similarity between the two distributions. In some aspects, if the KL divergence is greater than a threshold, the pair of event types are considered to be causally related; that is, the first event type is considered to cause the second event type. In some aspects, using the KL divergence for the comparison can reduce computational complexity compared to other methods of comparing distributions.

For example, if the threshold is set to 0.25 and the KL divergence is 0.1, then the arrival time distribution and the reference distribution are considered to be similar and there is no relationship between the corresponding pair of events.

In 460, method 400 includes updating a relationship probability in root-cause network 300 based on the comparison. Operation 460 can be performed by root-cause network generator 126.

In some aspects, updating the relationship probability can include updating a relationship probability for edge 320 in root-cause network 300 based on the relationship identified in operation 450. Edge 320, such as edge 320A, can connect a first node, such as node 310A, in root-cause network 300 representing the first event type to a second node, such as node 310B, in root-cause network 300 representing the second event type. As discussed herein, edges 320 connecting pairs of event types are directional, with the direction indicating that the event type of node 310 from which edge 320 is leaving causes the event type of node 310 to which the edge is traveling.

For example, if the first node and the second node are present in the root-cause network, but there is no edge between them, the edge can be added to reflect that operation 450 identified a relationship between the two event types. As another example, when the edge is present, the relationship property on the edge can be updated to reflect the new information about the relationship. The edge can be updated to include the relational time difference. In some aspects, the edge can be updated by combining arrival time distributions, averaging relational time differences, or otherwise updating the existing relationship probability to reflect any change identified in operation 450.

In some aspects, the arrival time distribution can further be compared to an existing arrival time distribution that has been assigned to edge 320. The comparison can be used to determine if the distribution has changed. If the distribution has changed, the existing arrival time distribution can be discarded and be replaced by the new arrival time distribution.

In some aspects, if operation 450 identifies that no relationship exists between the pair of network event types, operation 460 can include checking if there is an edge connecting the nodes for the pair of event types. If there is no relationship, operation 460 can include breaking the edge to reflect that the first event no longer causes the second event.

For example, if operation 450 identifies that no relationship exists between a first event type corresponding to node 310B and a second event type corresponding to node 310E, operation 460 can break or remove edge 320G from root-cause network 300. Conversely, if operation 450 identifies that a relationship exists between a first event type corresponding to node 310E and a second event type corresponding to node 310F, operation 460 can add a new edge 320 (not depicted) with a direction form node 310E to node 310F.

In some aspects, where an event type in a pair of network event types does not have a node in the root-cause network, operation 460 can include adding a node for the event type. For example, root-cause network 300 includes six nodes 310 that can correspond to six different event types. If a seventh event type is identified, a new node 310 (not shown) can be added to root-cause network 300.

In some aspects, updating a root-cause network can include generating the root-cause network 300. For example, if no root-cause network 300 exists, operation 460 can create nodes 310 and edges 320 that reflect the relationships determined in operation 450.

As a non-limiting example, a series of events received in operation 410 are processed in operation 420 to remove redundant information. In 430, each event is sorted into four event types: station authentication, station IP address changes, a DHCP server becoming unavailable, and station deauthentication. In operation 450, the arrival time distribution comparisons indicate that the DHCP server becoming unavailable can potentially cause station deauthentication, station IP address changes, and station authentication to occur. The relationship can be that the DHCP server becoming unavailable causes all three of station deauthentication, station authentication, and station IP address change. Statistics processor 124 can further determine a conditional probability that, given that all three of station deauthentication, station authentication, and station IP address change events occur, a DHCP service becoming unavailable is the cause. The conditional probability can be, for example 85%.

Station deauthentication exist as an event in root-cause network 300, but station authentication, station IP address changes, and the DHCP server becoming unavailable are not assigned to nodes in root-cause network 300. Operation 460 adds nodes for station authentication, station IP address changes, and the DHCP server becoming unavailable events. No other nodes are added because no other events were received that were not present in root-cause network 300. Based on the potentially causality determined in operation 450, edges are added directed from the DHCP server becoming unavailable node to the station deauthentication node, the station IP address changes node, and the station authentication node. These edges are assigned a probability (e.g., a probability relationship) based on the arrival time distribution corresponding to the relationship. An edge with the conditional probability connecting the node for the DHCP server becoming unavailable to each of the station deauthentication node, the station IP address changes node, and the station authentication node can also be added. This edge is assigned the conditional probability. No other edges are added because no other potential causes were identified in operation 450. Other existing nodes and edges in root-cause network 300 remain unchanged.

Figure 5:
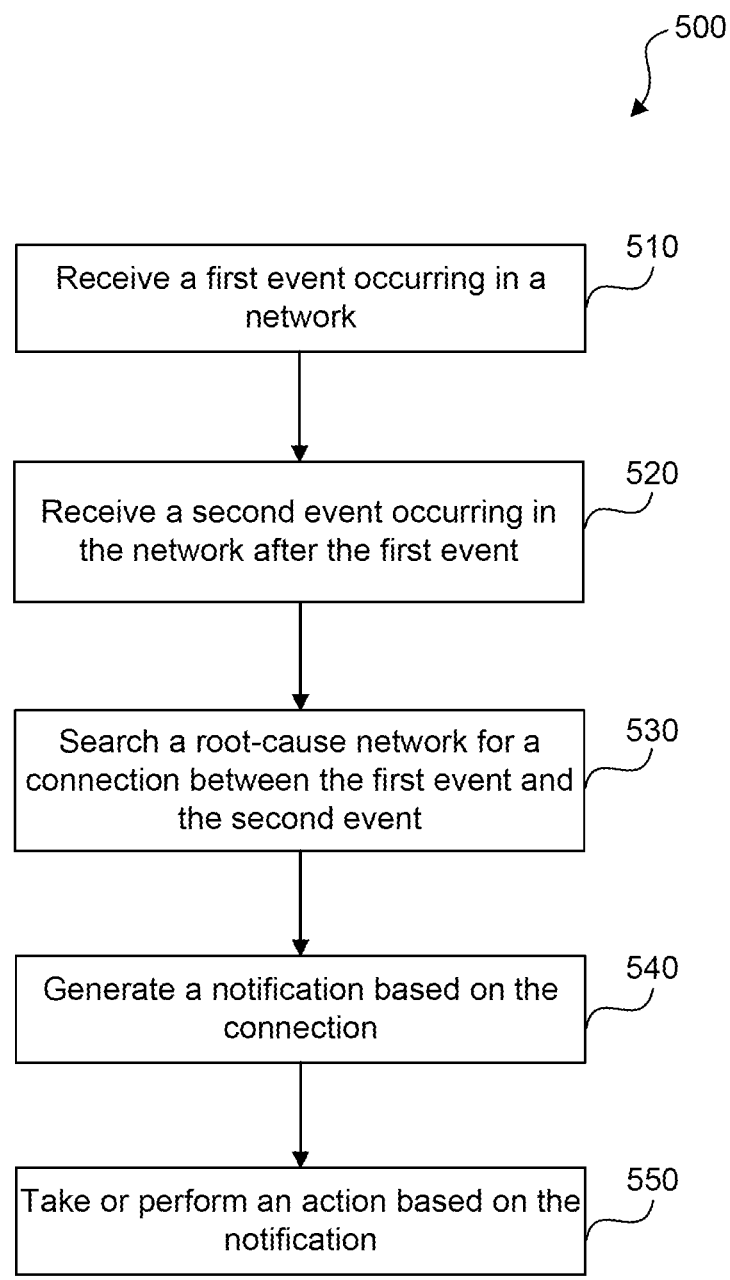
FIG. 5 is a flow chart illustrating a method for performing root-cause analysis on network events using a root-cause network, according to some aspects.

FIG. 5 is a flow chart illustrating a method 500 for performing root-cause analysis on events using a root-cause network, according to some aspects. Performing root-cause analysis on an event can determine whether the event was possibly caused by other events occurring in a network. Event analysis system 120 of FIG. 1 can perform method 500.

In 510, method 500 includes receiving a first event occurring in a network. The first event can be received by event processor 122. The first event can be received as a network event notification or another type of notification indicating that the first event occurred in the network. In some aspects, the network event notification can include a timestamp for when the first event occurred, a description of the first event, and topology information on where in the network the first event occurred. The network event notification can be received in response to the first event occurring in the network.

In some aspects, receiving the first event can include processing the event or the network event notification for the event to determine an event type for the event. The event type can be determined by event processor 122.

In 520, method 500 includes receiving a second event occurring in the network after the first event. The second event can be received by event processor 122. The second event can be received as a network event notification or another type of notification indicating that the second event occurred in the network. In some aspects, the network event notification can include a timestamp for when the second event occurred, a description of the second event, and topology information on where in the network the second event occurred. The network event notification can be received in response to the second event occurring in the network.

In some aspects, receiving the second event can include processing the second event or the network event notification for the second event to determine an event type for the event. The event type can be determined by event processor 122.

In 530, method 500 includes searching root-cause network 300 for a connection between the first event and the second event. The connection can be edge 320 in the root-cause network 300 connecting from a first node 310 representing the first event to a second node 310 representing the second event. Operation 530 can be performed by event processor 122. In some aspects, searching the root-cause network 300 can be performed by event processor 122 and root-cause network generator 126.

For example, if the first event has an event type corresponding to node 310C and the second event has an event type corresponding to node 310D, operation 530 searches root-cause network 300 and finds edge 320D connecting them. As another example, if the first event has an event type corresponding to node 310D and the second event has an event type corresponding to node 310C, operation 530 searches root-cause network 300 and finds no edge 320 connecting them (as edge 320D has the wrong direction).

In some aspects, operation 530 is performed in response to receiving the second event. In some aspects, operation 530 can be performed in response to a selection of the second event or the network event notification corresponding to the second event.

In some aspects, operation 530 includes, after searching for the connection, identifying the relationship probability or arrival time distribution on the connection. In some aspects, the relationship probability can be evaluated at an arrival time difference between the occurrence of the first event and the second event.

In some aspects, if the relationship probability is greater than a threshold, the connection can be found, but if the relationship probability is less than the threshold, the connection is considered to not be present. As an example, consider the threshold to be 0.5 and the relationship probability to be a distribution that is above 0.5 at arrival time differences between two minutes and ten minutes. A causal relationship exists for arrival time difference between two and ten minutes, but does not exist for arrival time differences outside of that time range.

As a non-limiting example, root-cause network 300 can have a node corresponding to a parameter change in a network configuration event type that has an edge directed to a different node corresponding to a radio power change event type. The edge can indicate, for example, a 91% probability that the parameter change event will cause the radio power change event. The first event received in operation 510 can be of the parameter change event type. The second event received in operation 520 can be of the radio power change event type. In operation 530, event processor 122 searches root-cause network 300 and identifies that the parameter change event type is indicated as a potential cause for a radio power change event type based on the edge connecting from their respective nodes. The threshold for identifying the connection can be 50%. Since the relationship probability (e.g., 91%) is greater than the threshold (50%), the parameter change event can be identified as a potential cause of the radio power change event.

In 540, method 500 includes generating a notification based on the connection. In some aspects, the notification can be generated in response to finding the connection or edge in the root-cause network. The notification can include a remedial response based on the connection or a relationship probability associated with the connection. In some aspects, operation 540 can be performed by notification generator 128.

In some aspects, the remedial response can be determined based on the pair of events connected by the connection. The remedial response can be selected from a list of known solutions for resolving the second event type in the pair of network events when the second event type is caused by the first event type.

In some aspects, when no connection is identified or present in operation 530, the notification can indicate that the second event is not caused by the first event. In some aspects, no connection is identified between the pair of events when an edge connecting nodes for the pair of event types is absent.

In 550, method 500 includes taking or performing an action based on the notification. In some aspects, the notification can include instructions or code to cause the network to take or perform the action. The action can repair a cause of the second event or otherwise resolve some issue associated with the event.

In some aspects, the notification can include instructions for a user to take to repair a cause of the second event or otherwise resolve some issue associated with the event.

Figure 6:
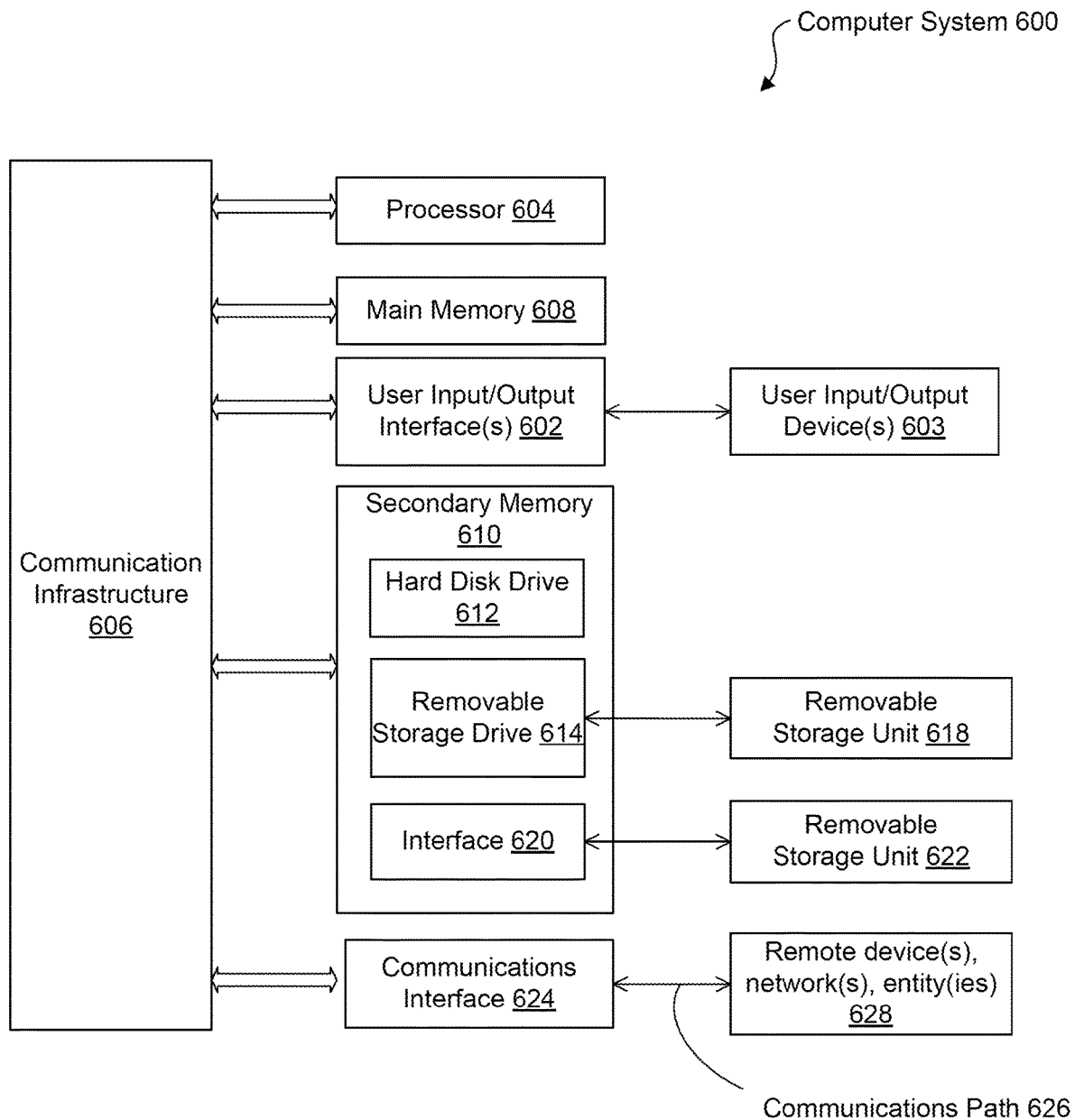
FIG. 6 illustrates a block diagram of a general-purpose computer that can be used to perform various aspects of the present disclosure, according to some aspects.

Various aspects can be implemented, for example, using one or more well-known computer systems, such as computer system 600 shown in FIG. 6. One or more computer systems 600 can be used, for example, to implement any aspect of the disclosure discussed herein, as well as combinations and sub-combinations thereof.

Computer system 600 can include one or more processors (also called central processing units, or CPUs), such as a processor 604. Processor 604 can be connected to a communication infrastructure or bus 606.

Computer system 600 can also include customer input/output device(s) 603, such as monitors, keyboards, pointing devices, etc., which can communicate with communication infrastructure 606 through customer input/output interface(s) 602.

One or more of processors 604 can be a graphics processing unit (GPU). In an aspect, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 can also include a main or primary memory 608, such as random access memory (RAM). Main memory 608 can include one or more levels of cache. Main memory 608 can have stored therein control logic (e.g., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 can include a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 can read from and/or write to removable storage unit 618.

Secondary memory 610 can include other means, devices, components, instrumentalities or other approaches for allowing computer programs and/or other instructions and/or data to be accessed by computer system 600. Such means, devices, components, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 can enable computer system 600 to communicate and interact with any combination of external devices, external networks, external entities, etc. (individually and collectively referenced by reference number 628). For example, communication interface 624 can allow computer system 600 to communicate with external or remote devices 628 over communications path 626, which can be wired and/or wireless (or a combination thereof), and which can include any combination of LANs, WANs, the Internet, etc. Control logic and/or data can be transmitted to and from computer system 600 via communication path 626.

Computer system 600 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

In some aspects, a tangible, non-transitory apparatus or article of manufacture includes a tangible, non-transitory computer useable or readable medium having control logic (software) stored thereon can also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), can cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 6. In particular, aspects can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, can need to be revisited. Further, the Examiner is also reminded that any disclaimer made in the instant application should not be read into or against the parent application.

What is claimed is:

1. A method, comprising:
receiving a first network event and a second network event occurring in a root-cause network;
determining a first network event type for the first network event and a second network event type for the second network event;
determining an arrival time distribution based on a time difference between an occurrence of the first network event and an occurrence of the second network event, wherein the first network event occurs before the second network event;
comparing the arrival time distribution to a reference distribution to determine a relationship between the first network event type and the second network event type; and
updating a relationship probability for an edge in the root-cause network based on the relationship, wherein the edge connects a first node in the root-cause network representing the first network event type to a second node in the root-cause network representing the second network event type.

2. The method of claim 1, wherein receiving the first network event comprises receiving a first network event notification indicating that the first network event occurred.

3. The method of claim 2, wherein the first network event notification comprises a timestamp indicating when the first network event occurred, a description of the first network event, and topology information on where in the root-cause network the first network event occurred.

4. The method of claim 1, further comprising processing the first network event and the second network event to remove redundant information of the first network event and the second network event.

5. The method of claim 1, wherein determining the first network event type for the first network event comprises determining the first network event type for the first network event based on a description of the first network event and a network topology associated with the root-cause network.

6. The method of claim 1, wherein determining the first network event type for the first network event comprises adding the first network event type with a matching event type to a group of network events having the first network event type.

7. The method of claim 1, wherein determining the arrival time distribution comprises comparing a first timestamp associated with the first network event with a second timestamp associated with the second network event.

8. The method of claim 1, wherein the reference distribution comprises a uniform distribution, a historical distribution, or an expected distribution.

9. The method of claim 1, wherein the relationship between the first network event type and the second network event type indicates that the first network event type did not cause the second network event type.

10. The method of claim 1, wherein the relationship between the first network event type and the second network event type indicates that the first network event type caused the second network event type.

11. A system, comprising:
one or more processors; and
memory communicatively coupled to the one or more processors, wherein the memory stores instructions configured to, when executed, cause the one or more processors to:
receive a first network event and a second network event occurring in a root-cause network;
determine a first network event type for the first network event and a second network event type for the second network event;
determine an arrival time distribution based on a time difference between an occurrence of the first network event and an occurrence of the second network event, wherein the first network event occurs before the second network event;
compare the arrival time distribution to a reference distribution to determine a relationship between the first network event type and the second network event type; and
update a relationship probability for an edge in the root-cause network based on the relationship, wherein the edge connects a first node in the root-cause network representing the first network event type to a second node in the root-cause network representing the second network event type.

12. The system of claim 11, wherein to receive the first network event, the instructions further cause the one or more processors to receive a first network event notification indicating that the first network event occurred.

13. The system of claim 12, wherein the first network event notification comprises a timestamp indicating when the first network event occurred, a description of the first network event, and topology information on where in the root-cause network the first network event occurred.

14. The system of claim 11, wherein the instructions further cause the one or more processors to process the first network event and the second network event to remove redundant information of the first network event and the second network event.

15. The system of claim 11, wherein to determine the first network event type for the first network event, the instructions further cause the one or more processors to determine the first network event type for the first network event based on a description of the first network event and a network topology associated with the root-cause network.

16. The system of claim 11, wherein to determine the first network event type for the first network event, the instructions further cause the one or more processors to add the first network event type with a matching event type to a group of network events having the first network event type.

17. The system of claim 11, wherein to determine the arrival time distribution, the instructions further cause the one or more processors to compare a first timestamp associated with the first network event with a second timestamp associated with the second network event.

18. The system of claim 11, wherein the reference distribution comprises a uniform distribution, a historical distribution, or an expected distribution.

19. The system of claim 11, wherein the relationship between the first network event type and the second network event type indicates that the first network event type did not cause the second network event type.

20. A non-transitory computer readable storage medium having computer readable code thereon, the non-transitory computer readable storage medium including instructions configured to cause a computer system to perform operations, comprising:

receiving a first network event and a second network event occurring in a root-cause network;

determining a first network event type for the first network event and a second network event type for the second network event;

determining an arrival time distribution based on a time difference between an occurrence of the first network event and an occurrence of the second network event, wherein the first network event occurs before the second network event;

comparing the arrival time distribution to a reference distribution to determine a relationship between the first network event type and the second network event type; and updating a relationship probability for an edge in the root-cause network based on the relationship, wherein the edge connects a first node in the root-cause network representing the first network event type to a second node in the root-cause network representing the second network event type.

\* \* \* \* \*